(12) United States Patent
Shao et al.

(10) Patent No.: US 12,500,416 B2
(45) Date of Patent: Dec. 16, 2025

(54) METHOD, INTERNET OF THINGS SYSTEM AND STORAGE MEDIUM FOR GOVERNMENT POWER SUPPLY REGULATION IN SMART CITY

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Yaqiang Quan, Chengdu (CN); Yong Li, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 788 days.

(21) Appl. No.: 17/810,824

(22) Filed: Jul. 5, 2022

(65) Prior Publication Data

US 2023/0369855 A1    Nov. 16, 2023

(30) Foreign Application Priority Data

May 16, 2022  (CN) .................. 202210532059.X

(51) Int. Cl.
  *H02J 3/00*    (2006.01)
  *G01W 1/10*    (2006.01)
  (Continued)

(52) U.S. Cl.
  CPC ............... *H02J 3/003* (2020.01); *G01W 1/10* (2013.01); *G06Q 10/04* (2013.01); *G06Q 50/06* (2013.01);
  (Continued)

(58) Field of Classification Search
  None
  See application file for complete search history.

(56) References Cited

U.S. PATENT DOCUMENTS

2020/0027096 A1   1/2020 Cooner
2021/0182980 A1*  6/2021 Rahman ............ G06Q 30/0204
(Continued)

FOREIGN PATENT DOCUMENTS

CN          114418468 A      4/2022

OTHER PUBLICATIONS

Shao, Zehua, Exploration and Research on the Structure of Internet of Things, Internet of Things Technologies Reliable Transmission, 2015, 10 pages.
(Continued)

*Primary Examiner* — Sean Shechtman
(74) *Attorney, Agent, or Firm* — METIS IP LLC

(57) ABSTRACT

A method, an internet of things system and a storage medium for government power supply regulation in a smart city are provided. The method may be implemented by a government power supply regulation and management platform and include: obtaining weather features of a target area in a future time period, time event features of the target area in the future time period, and basic economic development features of the target area in a current time period; predicting, based on the features, per capita living electricity consumption of the target area in the future time period through an electricity consumption prediction model; and determining, based on the per capita living electricity consumption of the target area in the future time period, a power supply strategy of the target area in the future time period.

15 Claims, 7 Drawing Sheets

(51) Int. Cl.
*G06Q 10/04* (2023.01)
*G06Q 50/06* (2024.01)
*G06Q 50/26* (2024.01)
*G16H 40/63* (2018.01)
*G16H 40/67* (2018.01)
*G16H 50/20* (2018.01)
*G16H 50/30* (2018.01)
*G16H 50/70* (2018.01)
*G16H 50/80* (2018.01)

(52) U.S. Cl.
CPC ............ *G06Q 50/26* (2013.01); *G16H 40/63* (2018.01); *G16H 40/67* (2018.01); *G16H 50/20* (2018.01); *G16H 50/30* (2018.01); *G16H 50/70* (2018.01); *G16H 50/80* (2018.01)

(56) References Cited

U.S. PATENT DOCUMENTS

| 2023/0115235 | A1* | 4/2023 | Shono | G01W 1/10 |
| | | | | 700/291 |
| 2023/0223754 | A1* | 7/2023 | Oki | H02J 3/003 |
| | | | | 700/291 |

OTHER PUBLICATIONS

Shao, Zehua, The Internet of Things sense the world beyond the world, China Renmin University Press, 2017, 30 pages.
Shao, Zehua, Smart City Architecture, Internet of Things Technologies Intelligent Processing and Application, 2016, 7 pages.

* cited by examiner

300

310 Obtaining weather features of a target area in a future time period, time event features of the target area in the future time period, and basic economic development features of the target area in a current time period

320 Predicting, based on the weather features of a target area in the future time period, the time event features of the target area in the future time period, and the basic economic development features of the target area in the current time period, per capita living electricity consumption of the target area in the future time period through an electricity consumption prediction model

330 Determining, based on the per capita living electricity consumption of the target area in the future time period, a power supply strategy of the target area in the future time period

340 Determining, based on the per capita living electricity consumption of the target area in the future time period, a target power supply strategy of the target area in the future time period

METHOD, INTERNET OF THINGS SYSTEM AND STORAGE MEDIUM FOR GOVERNMENT POWER SUPPLY REGULATION IN SMART CITY

CROSS-REFERENCE TO RELATED APPLICATIONS

This application claims priority of Chinese Patent Application No. 202210532059.X, filed on May 16, 2022, the entire contents of which are hereby incorporated by reference.

TECHNICAL FIELD

The present disclosure relates the field of the Internet of Things and the cloud platform, and in particular, to methods and internet of things systems for government power supply regulation in a smart city.

BACKGROUND

Under the combined effect of the green transformation on the energy supply side and the increase in the proportion of electrification on the consumer side, the problem of insufficient power supply may continue for a long time, which requires accelerating the reform of power marketization, and guiding supply and demand to better match through the price mechanism. With the development of information science and technology, the concept of the cloud platform and its application in the Internet of Things are increasingly mentioned. Therefore, the Internet of Things platform may be configured to provide efficient and reasonable methods for government power supply regulation.

Therefore, it is desirable to provide a method, an internet of things system and a storage medium for government power supply regulation in a smart city. Accurate power supply strategies can be determined and electricity subsidies can be reasonably distributed to citizens by using the Internet of Things and the cloud platform, which can achieve more scientific government power supply regulation, promote citizens to save energy, reduce power supply gaps, and reduce power supply pressure.

SUMMARY

One of the embodiments of the present disclosure provides methods for government power supply regulation in a smart city. The method for government power supply regulation in a smart city may include: obtaining weather features of a target area in a future time period, time event features of the target area in the future time period, and economic development features of the target area in a current time period; predicting, based on the weather features of a target area in a future time period, the time event features of the target area in the future time period, and the economic development features of the target area in a current time period, per capita living electricity consumption of the target area in the future time period through an electricity consumption prediction model; and determining, based on the per capita living electricity consumption of the target area in the future time period, a power supply strategy of the target area in the future time period.

One of the embodiments of the present disclosure provides systems for government power supply regulation in a smart city. The system may include a user platform, a government service platform, a government power supply regulation and management platform, a government sensor network platform and an object platform that interact in sequence. The government power supply regulation and management platform may be configured to perform operations including: obtaining weather features of a target area in a future time period, time event features of the target area in the future time period, and economic development features of the target area in a current time period; predicting, based on the weather features of a target area in a future time period, the time event features of the target area in the future time period, and the economic development features of the target area in a current time period, per capita living electricity consumption of the target area in the future time period through an electricity consumption prediction model; and determining, based on the per capita living electricity consumption of the target area in the future time period, a power supply strategy of the target area in the future time period.

One of the embodiments of the present disclosure provides a computer-readable storage medium storing computer instructions, wherein when reading the computer instructions in the storage medium, a computer implements the method for government power supply regulation in a smart city.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, and wherein:

FIG. 3 is a flowchart illustrating an exemplary process for government power supply regulation according to some embodiments of the present disclosure;

DETAILED DESCRIPTION

Figure 1:
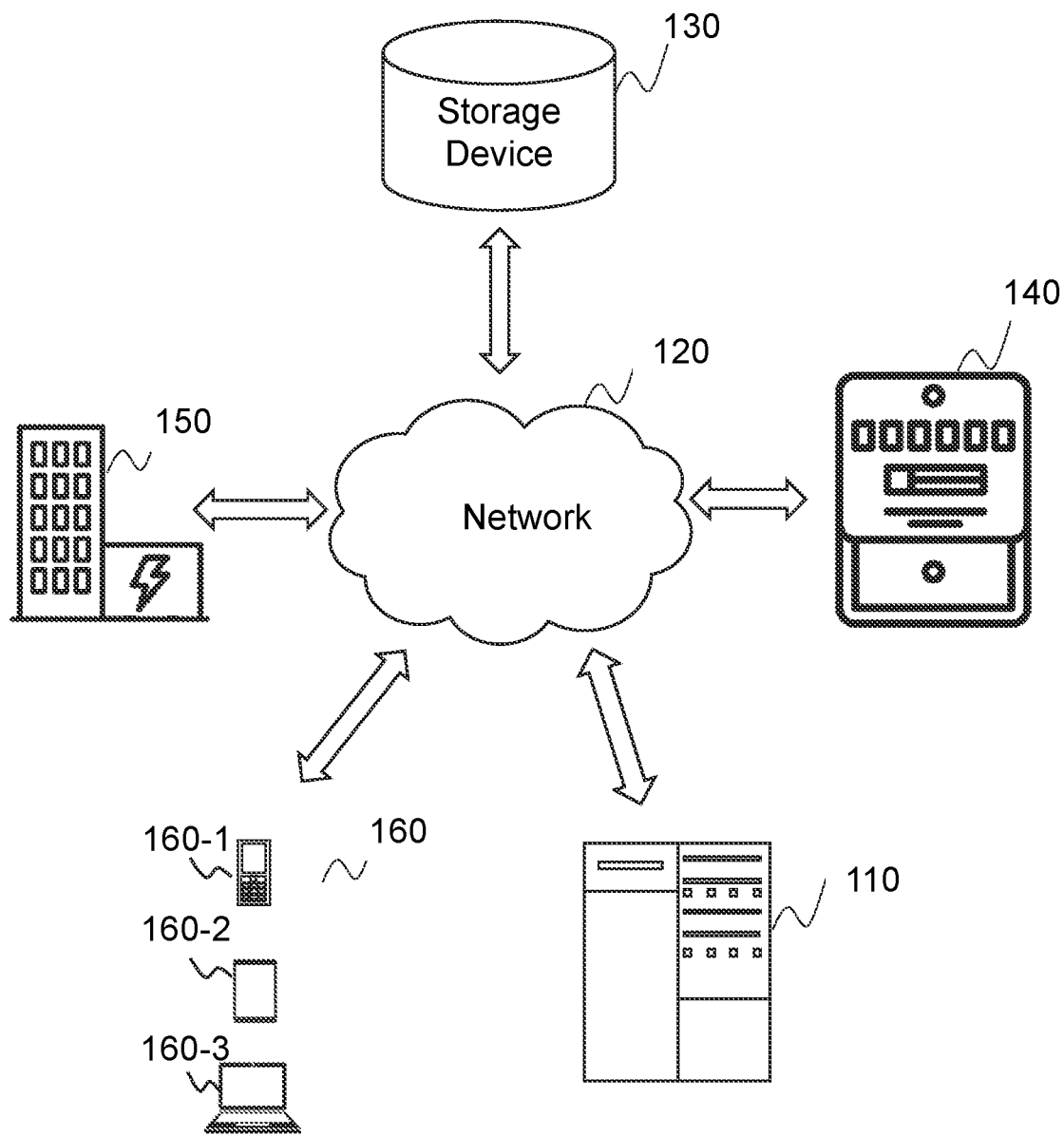
FIG. 1 is a schematic diagram illustrating an exemplary application scenario of government power supply regulation in a smart city according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

FIG. 1 is a schematic diagram illustrating an exemplary application scenario of government power supply regulation in a smart city according to some embodiments of the present disclosure.

In some embodiments, an application scenario 100 may include a processing device 110, a network 120, storage device 130, a smart meter 140, a power supply enterprise 150, and a terminal device 160. In some embodiments, components in the application scenario 100 may connect and/or communicate with each other through the network 120 (such as a wireless connection, a wired connection, or any combination thereof). For example, the processing device 110 may be connected to the storage device 130 through the network 120. As another example, the smart meter 140 may be connected to the processing device 110 and the storage device 130 through the network 120.

The processing device 110 may be configured to process information and/or data related to the application scenario 100. For example, weather features of a target area in a future time period, time event features of the target area in the future time period, and economic development features of the target area in a current time period, a target power supply strategy of the target area in the future time period, or the like. The processing device 110 may process data, information and/or processing results obtained from other devices or system components. The processing device 100 may execute program instructions based on the data, information, and/or processing results to perform one or more functions described in the present disclosure.

The network 120 may connect each component of the application scenario 100 and/or connect the application scenario 100 with external resources. The network enables communication between the components and between the components and other components outside the application scenario 100 to exchange data and/or information. The network may include a local area network, a wide area network, the Internet, or the like, or any combination thereof.

The storage device 130 may be configured to store data and/or instructions. In some embodiments, the storage device 130 may store data and/or instructions that the processing device 110 may execute or use to perform exemplary methods described in the present disclosure. In some embodiments, the storage device 13 may be connected to the network 120 to communicate with one or more components of the application scenario 100 (for example, the processing device 110, the smart meter 140, the power supply enterprise 150, and the terminal device 160).

The smart meter 140 may be configured to collect electricity consumption data and/or information. For example, an actual per capita living electricity consumption of a target area in a second historical time period, or the like. In some embodiments, the smart meter 140 may send the collected data and/or information to the processing device 110 through the network.

The power supply enterprise 150 may be configured to supply and/or dispatch electricity. For example, power supply enterprises may supply electricity to citizens. Exemplary power supply enterprises may include various municipal power supply companies under State Grid or China Southern Power Grid.

In some embodiments, the terminal device 160 may be configured to query a power supply strategy and a corresponding subsidy amount (that is, a subsidy amount corresponding to a power supply strategy). For example, citizens may query a subsidy amount of the current month through the terminal device. The terminal device 160 may also be configured to obtain the weather features of a target area in a future time period, the time event features of the target area in the future time period, and the economic development features of the target area in a current time period. For example, the terminal device 160 may include a smartphone 160-1, a tablet computer 160-2, a laptop computer 160-3, etc.

It should be noted that the above description is intended to be illustrative, and not to limit the scope of the present disclosure. For those skilled in the art, various variations and modifications can be made under the guidance of the present disclosure. For example, the application scenario may also include databases. As another example, the application scenario may be implemented on other devices to achieve similar or different functions. However, those variations and modifications do not depart from the scope of the present disclosure.

The Internet of Things system may be an information processing system that includes part or all of an object platform, a sensor network platform, a management platform, a service platform, and a user platform. The management platforms may realize overall planning and coordination of the connection and collaboration between various functional platforms (such as a sensor network platform and an object platform). The management platform may gather together information of the Internet of Things operation system and provide perception management and control management functions for the Internet of Things operation system. The sensor network platform may connect to the management platform and the object platform, and play functions of perception information sensing and control information sensing communication. The object platform may be a functional platform for generating perception information and executing control information. The service platform may be a platform that provides input and output services to users. The user platform may be a user-oriented platform, including obtaining users' needs and feeding back information to users.

Processing of information in the Internet of Things system may be divided into a processing flow of perception information and a processing flow of control information. The control information may be information generated based on the perception information. Processing of the perception information may be that the object platform obtains the perception information and transmits the perception information to the management platform through the sensor network platform. The control information may be sent by the management platform to the object platform through the sensor network platform, so as to realize the control of the corresponding object.

In some embodiments, when the Internet of Things system is applied to city management, the Internet of Things system may be called a smart city Internet of Things system.

Figure 2:
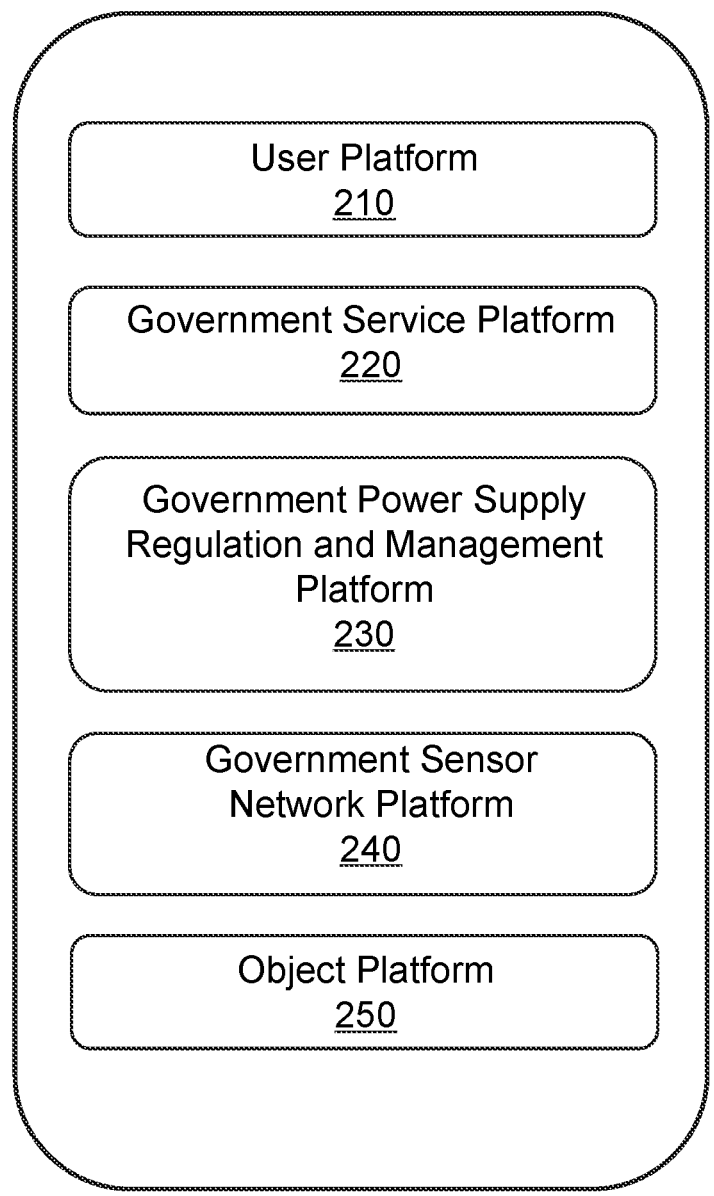
FIG. 2 is a structural platform diagram illustrating an exemplary schematic diagram illustrating a system for government power supply regulation in a smart city according to some embodiments of the present disclosure.

FIG. 2 is a structural platform diagram illustrating an exemplary schematic diagram illustrating a system for government power supply regulation in a smart city according to some embodiments of the present disclosure. As shown in FIG. 2, the system for government power supply regulation in a smart city 200 may be implemented based on the Internet of Things system. The government power supply regulation system in a smart city 200 may include a user platform 210, a government service platform 220, a government power supply regulation and management platform 230, a government sensor network platform 240 and an object platform 250. In some embodiments, the system for government power supply regulation in a smart city 200 may be a part of the processing device 110 or implemented by the processing device 110.

In some embodiments, the system for government power supply regulation in a smart city 200 may be applied to various scenarios of government power supply regulation. In some embodiments, the system for government power supply regulation in a smart city 200 may respectively obtain data related to electricity consumption in a plurality of scenarios in order to obtain government power supply regulation strategies in various scenarios. In some embodiments, the system for government power supply regulation in a smart city 200 may obtain a government power supply regulation strategy for an entire area (such as an entire city) based on the obtained data related to electricity consumption in various scenarios.

A plurality of scenarios for government power supply regulation may include scenarios such as industrial power supply, agricultural power supply, citizen power supply, or the like. For example, the government power supply regulation may include citizen power supply regulation, etc. It should be noted that the above scenarios are merely an example, which does not limit the specific application scenarios of the system for government power supply regulation in a smart city 200. Those skilled in the art may apply the system for government power supply regulation in a smart city 200 to any other appropriate scenarios on the basis of the content disclosed in the embodiment.

In some embodiments, the system for government power supply regulation in a smart city 200 may be applied to citizen power supply regulation. When applied to the citizen power supply regulation, the object platform 250 may be configured to collect data related to power supply prediction. For example, weather features of a target area in a future time period, time event features of the target area in the future time period, economic development features of the target area in a current time period, or the like. The object platform 250 may upload the collected data related to power supply prediction to the government sensor network platform 240. The government sensor network platform 240 may summarize and process the collected data. The government sensor network platform 240 may upload the data further summarized and processed to the government power supply regulation and management platform 230. The government power supply regulation and management platform 230 may make strategies or instructions related to power supply prediction based on the processing of data collected, such as power supply strategies, or the like.

It will be understood that for those skilled in the art, after understanding the principle of the system, it is possible to apply the system to any other appropriate scenario without departing from this principle.

The system for government power supply regulation in a smart city 200 may be specifically illustrated as follows by taking a scenario in which the government power supply regulation system in a smart city 200 is applied to citizen power supply as an example.

It should be noted that a sub-platform refers to a partial platform divided from a platform according to a task type. In some embodiments, the government service platform 220, the government power supply regulation and management platform 230, the government sensor network platform 240 and the object platform 250 may all be provided with a plurality of sub-platforms as required. The sub-platform may assist the platform to complete the processing of information more efficiently and solve the problem of insufficient computing power of the platform.

A database may refer to a set of stored data. For example, the management platform database may store data information such as weather features of a target area in a future time period, time event features of the target area in the future time period, economic development features of the target area in a current time period, or the like.

A sub-database may refer to a partial data set divided from a database according to a data type. In some embodiments, a service platform database, a management platform database, and a sensor network platform database may all be provided with a plurality of sub-databases as required.

The user platform 210 may be a citizen-oriented platform, including obtaining citizens' needs and feeding back information to citizens. For example, the user platform 210 may obtain input instructions from citizens through a terminal device (for example, the terminal device 160), and query a power supply strategy of the target area. As another example, the user platform 210 may feedback information on a subsidy scheme to citizens.

The government service platform 220 may be a platform that provides input and output services to citizens. For example, the government service platform 220 may obtain the query instructions issued by a citizen through the user platform 210, query an electricity consumption subsidy scheme, and feedback the electricity consumption subsidy scheme to the citizen.

The government power supply regulation and management platform 230 may refer to a platform for managing government power supply regulation in smart cities. In some embodiments, the government power supply regulation and management platform 230 may belong to a management platform. The government power supply regulation and management platform 230 may be configured to obtain weather features of a target area in a future time period, time event features of the target area in the future time period, and economic development features of the target area in a current time period based on the object platform 250 through the government sensor network platform 240.

In some embodiments, the government power supply regulation and management platform 230 may include a management information-integrated management platform and a plurality of management sub-platforms.

In some embodiments, the government power supply regulation and management platform 230 may include a management sub-platform such as a power supply regulation sub-platform, a financial management sub-platform, or any combination thereof. Different management sub-platforms may independently provide information for the management information-integrated management platform through different management platform sub-databases. For example, the power supply regulation sub-platform may provide government power supply regulation information for the management information integrated management platform through the power supply regulation database. The financial management sub-platform may provide financial management information for the management information-integrated management platform through the financial management database. The management information-integrated management platform may perform integrated management on the received information, and send the information to the government service platform 220 according to the needs of citizens.

In some embodiments, the management platform database may obtain weather features of a target area in a future time period, time event features of the target area in the future time period, and economic development features of the target area in a current time period based on the object platform 250. The management sub-platform database may obtain weather features of a target area in a future time period, time event features of the target area in the future time period, and economic development features of the target area in a current time period based on management platform database.

In some embodiments, the government power supply regulation and management platform 230 may also be configured to determine a total subsidy amount corresponding to a target power supply strategy of the target area in the future time period based on a target power supply strategy of the target area in the future time period, and send the total subsidy amount corresponding to a target power supply strategy of the target area in the future time period to the financial management sub-platform.

Detailed descriptions regarding the government power supply regulation and management platform 230 may be found elsewhere in the present disclosure (e.g., FIGS. 3-4 and relevant descriptions), which will not be repeated herein.

The government sensor network platform 240 may refer to a platform for unified management of sensing communication, which may also be called a sensor network management platform or a sensor network management server. In some embodiments, the government sensor network platform 240 may be connected to the government power supply regulation and management platform 230 and the object platform 250 to realize functions of perception information sensing communication and control information sensing communication. In some embodiments, the government sensor network platform 240 may be configured as an Internet of Things gateway, which may be configured to establish a channel for uploading perception information and issuing control information of a terminal device (e.g., a terminal device 160) and/or a smart meter (e.g., a smart meter 140) and a management platform (e.g., a government power supply regulation and management platform 230). In some embodiments, the government sensor network platform 240 may include a plurality of sensor network sub-platforms. The sensor network sub-platform may be sensor network sub-platform corresponding to different object platforms 250 (for example, a terminal device sub-platform and a smart meter sub-platform), which may process data uploaded by the terminal device and the smart meter and store the data to the sensor network platform database. The data may be distributed to different sensor network platform sub-databases for processing and storage. The processed data may be summarized and stored by the sensor network platform database, transmitted to a sensor information integrated management platform, uniformly transmitted to the government power supply regulation and management platform 230 by the sensor information management-integrated management platform, and stored by the management platform database.

The object platform 250 may refer to a functional platform for generating perception information and executing control information, which may be a final platform for realizing citizens' will. In some embodiments, the object platform 250 may obtain information. The information obtained may be used as information input of the entire Internet of Things.

Perception information may refer to information obtained by a physical entity. For example, information obtained by a smart meter. The control information may refer to control information formed after the perception information is identified, verified, analyzed, converted, etc., such as control instructions.

In some embodiments, the object platform 250 may be configured as a terminal device and a smart meter. In some embodiments, the object platform 250 may be classified into a plurality of object sub-platforms based on different types of sensing devices. For example, the object platform 250 may be classified as a terminal device platform based on a terminal device, including one or more terminal devices. The object platform 250 may be classified as a smart meter platform based on a smart meter, including one or more smart meters.

It should be noted that the above description of the system and its components is merely provided for the purposes of illustration, and not intended to limit the scope of the present disclosure. It will be understood that for those skilled in the art, after understanding the principle of the system, it is possible to arbitrarily combine various components, or form subsystems to connect with other components without departing from this principle. As another example, each component may share a storage module. Each component may have its own storage module. Those variations are still within the scope of the present disclosure.

Through the Internet of Things functional architecture of the five platforms, the government power supply regulation in a smart city can be implemented, which completes the closed loop of the information process and makes the Internet of Things information processing smoother and more efficient.

FIG. 3 is a flowchart illustrating an exemplary process for government power supply regulation according to some embodiments of the present disclosure. As shown in FIG. 3, the process 300 may include the following operations. In some embodiments, the process 300 may be performed by the government power supply regulation and management platform 230.

In 310, weather features of a target area in a future time period, time event features of the target area in the future time period, and economic development features of the target area in a current time period may be obtained.

The target area may refer to an area where the government is to perform power supply regulation. In some embodiments, the target area may include a city, an area, or the like. For example, the target area may be Beijing. As another example, the target area may be Chaoyang District, Beijing.

The current time period may refer to a time period from a certain moment in the past to a current moment. The future time period may refer to a time period from a current moment to a certain moment in the future. For example, if the current moment is 24:00 on Jun. 30, 2032, the current time period may be from 24:00 on May 31, 2032 to 24:00 on Jun. 30, 2032. The future time period may be 24:00 on Jun. 30, 2032 to 24:00 on Jul. 31, 2032.

The weather features of the target area in the future time period may refer to predicted average values of temperature and rainfall of the target area in the future time period. For example, if the current time is 24:00 on Jun. 30, 2032, the weather features of the target area in the future time period may be the predicted average values of temperature and rainfall of the target area from 24:00 on Jun. 30, 2032 to 24:00 on Jul. 31, 2032.

In some embodiments, the object platform 250 may obtain the weather features of the target area in the future time period based on the terminal device.

The time event features of the target area in the future time period may refer to important events that influence the electricity consumption of the target area in the future time period. In some embodiments, the time event features of the target area in the future time period may be holiday features (that is, a total count of holidays in the future time period). For example, during holidays, most people stay at home, and the electricity consumption in citizen areas may increase. Therefore, the total count of holidays of the target area in the future time period may be used as the time event features in the future time period. In some embodiments, the time event features of the target area in the future time period may be regional event features (that is, an event that may cause changes in electricity consumption of the area in the future time period). For example, there is a new policy in the target area that the electricity price will drop from the next month, so the electricity consumption of the area may increase next month. Therefore, the regional event that influences the electricity consumption may be quantified as an influence value of electricity consumption as the time event features of the target area in the future time period.

The influence value of electricity consumption may refer to the degree of influence on electricity consumption. In some embodiments, the influence value of electricity consumption may be a value that can reflect the degree of influence on the electricity consumption. For example, the influence value of electricity consumption may be a value between −10~10. If a regional event makes the electricity consumption increases, a positive value may be taken. If a regional event makes the electricity consumption decreases, a negative value may be taken. The larger an absolute value of the influence value of electricity consumption, the higher the degree of influence on electricity consumption. In some embodiments, the influence value of electricity consumption may be determined based on human experience.

In some embodiments, the object platform 250 may obtain the time event features of the target area in the future time period based on the terminal device.

The economic development features in a current time period may refer to basic data of the economic development of the target area in the current time period. For example, if the current moment is 24:00 on Jun. 30, 2032, the economic development features of the target area in the current time period may be a total GDP, a per capita GDP, an education level, a per capita tax, etc., of the target area from 24:00 on May 31, 2032 to 24:00 on Jun. 30, 2032.

In some embodiments, the object platform 250 may obtain the economic development features of the target area in the current time period based on terminal device.

In 320, per capita living electricity consumption of the target area in the future time period may be predicted through an electricity consumption prediction model based on the weather features of a target area in a future time period, the time event features of the target area in the future time period, and the economic development features of the target area in a current time period.

The per capita living electricity consumption of the target area in the future time period may refer to an average living electricity consumption of each person of the target area in the future time period. For example, if the current moment is 24:0:00 on Jun. 30, 2032, the per capita living electricity consumption of the target area in the future time period may be a predicted average living electricity consumption of each person of the target area from 24:00 on Jun. 30, 2032 to 24:00 on Jul. 31, 2032.

In some embodiments, the government power supply regulation and management platform 230 may predict, based on the weather features of a target area in a future time period, the time event features of the target area in the future time period, and the economic development features of the target area in a current time period, per capita living electricity consumption of the target area in the future time period through an electricity consumption prediction model.

In some embodiments, after the weather features of the target area in the future time period, the time event features of the target area in the future time period, and the economic development features of the target area in the current time period are input into the electricity consumption prediction model, the per capita living electricity consumption of the target area in the future time period may be predicted by the electricity consumption prediction model. In some embodiments, the input of the electricity consumption prediction model may also include a count of persons quarantined due to an epidemic of the target area in the future time period.

The electricity consumption prediction model may be a Deep Neural Networks (DNN), a Recurrent Neural Network (RNN), a Convolutional Neural Networks (CNN), etc. Detailed descriptions regarding obtaining the electricity consumption prediction model may be found elsewhere in the present disclosure (e.g., FIG. 5 and relevant descriptions), which will not be repeated herein.

In 330, a power supply strategy of the target area in the future time period may be determined based on the per capita living electricity consumption of the target area in the future time period.

The power supply strategy of the target area in the future time period may refer to a power supply scheme of the target area in the future time period. In some embodiments, the power supply strategy of the target area in the future time period may include a preset maximum per capita living electricity consumption and a subsidy amount for saving a unit of electricity (for example, a subsidy amount for saving one kilowatt-hour of electricity). The preset maximum per capita living electricity consumption may be a threshold set artificially. When per capita living electricity consumption of a family of the target area in the future time period is lower than the preset maximum per capita living electricity consumption, a subsidy amount may be determined based on the difference between the actual value of the per capita living electricity consumption of the family and the preset maximum per capita living electricity consumption (for example, when saving each kilowatt-hour of electricity, the household may be subsidized for the subsidy amount corresponding to the kilowatt-hour of electricity saved). For example, the power supply strategy of the target area in the future time period may be that the preset maximum per capita living electricity consumption is 300 kilowatt-hours, and 2 cents will be subsidized per kilowatt-hour of electricity saved of the actual per capita living electricity consumption compared with the preset maximum per capita living electricity consumption.

In some embodiments, the government power supply regulation and management platform 230 may determine the power supply strategy of the target area in the future time period based on the per capita living electricity consumption of the target area in the future time period. Detailed descriptions regarding determining the power supply strategy may be found elsewhere in the present disclosure (e.g., FIG. 4 and relevant descriptions), which will not be repeated herein.

In 340, a target power supply strategy of the target area in the future time period may be determined based on the per capita living electricity consumption of the target area in the future time period.

The target power supply strategy may refer to a power supply strategy finally determined.

In some embodiments, the government power supply regulation and management platform 230 may determine, based on the reduction rate corresponding to the each group of the candidate power supply strategies, the target power supply strategy of the target area in the future time period. Detailed descriptions regarding the target power supply strategy may be found elsewhere in the present disclosure (e.g., FIG. 4 and relevant descriptions), which will not be repeated herein.

By predicting the per capita living electricity consumption in the future time period, the accurate preset maximum per capita living electricity consumption and the subsidy amount for saving a unit of electricity may be determined, and the electricity consumption subsidies may be reasonably distributed to the citizens, which can realize more scientific government power supply regulation, promote citizens to save energy, reduce the power supply gap, and reduce the pressure of power supply.

Figure 4:
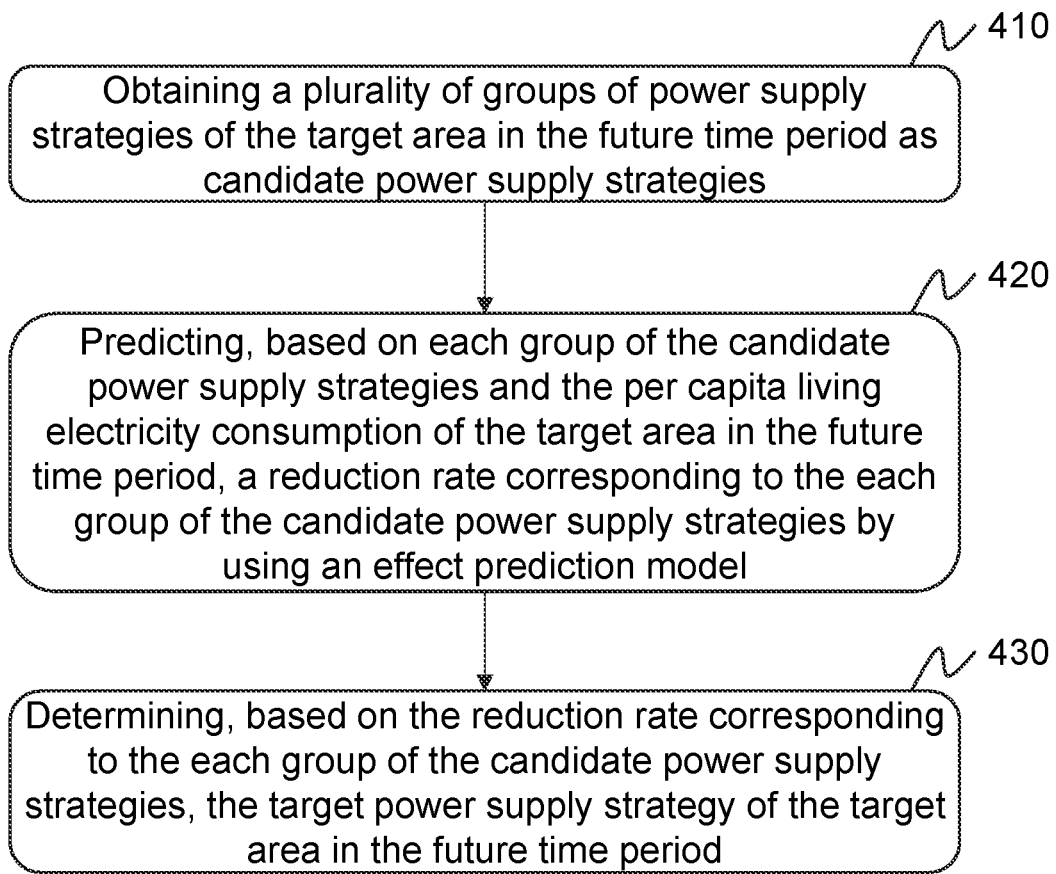
FIG. 4 is a flowchart illustrating an exemplary process for determining a target power supply strategy of a target area in a future time period according to some embodiments of the present disclosure.

FIG. 4 is a flowchart illustrating an exemplary process for determining a target power supply strategy of a target area in a future time period according to some embodiments of the present disclosure. As shown in FIG. 4, the process 400 may include the following operations. In some embodiments, the process 400 may be performed by the government power supply regulation and management platform 230.

In 410, a plurality of groups of power supply strategies of the target area in the future time period may be obtained as candidate power supply strategies.

A candidate power supply strategy may refer to a strategy to be selected as a target power supply strategy. In some embodiments, the candidate power supply strategies may include a plurality of groups of power supply strategies. For example, candidate power supply strategy 1 may be that the preset maximum per capita living electricity consumption is 300 kilowatt-hours, and 2 cents will be subsidized per kilowatt-hour of electricity saved when the actual per capita living electricity consumption is compared with the preset maximum per capita living electricity consumption. Candidate power supply strategy 2 may be that the preset maximum per capita living electricity consumption is 290 kilowatt-hours, and 2 cents will be subsidized per kilowatt-hour of electricity saved when the actual per capita living electricity consumption is compared with the preset maximum per capita living electricity consumption. Candidate power supply strategy 3 may be that the preset maximum per capita living electricity consumption is 280 kilowatt-hours, and 3 cents will be subsidized per kilowatt-hour of electricity saved when the actual per capita living electricity consumption is compared with the preset maximum per capita living electricity consumption. Candidate power supply strategy 4 may be that the preset maximum per capita living electricity consumption is 270 kilowatt-hours, and 3 cents will be subsidized per kilowatt-hour of electricity saved when the actual per capita living electricity consumption is compared with the preset maximum per capita living electricity consumption.

In some embodiments, the government power supply regulation and management platform 230 may adjust the per capita living electricity consumption of the target area in the future time period based on a plurality of preset reduction ranges, and determine the preset maximum per capita living electricity consumption.

The preset reduction range may refer to a preset reduction range. For example, the preset reduction range may be 10 kilowatt-hours. When the predicted per capita living electricity consumption of the target area in the future time period is 300 kilowatt-hours, the preset maximum per capita living electricity consumption may be 300 kilowatt-hours, 290 kilowatt-hours, 280 kilowatt-hours, and 270 kilowatt-hours. (Assuming that according to historical data, a count of persons whose actual per capita living electricity consumption is lower than 260 kilowatt-hours is lower than a certain threshold (for example, 5%), it is almost impossible for citizens to achieve the preset maximum per capita living electricity consumption if the maximum per capita living electricity consumption is set to be lower than 260 kilowatt-hours, which will not achieve the purpose of promoting citizens to save electricity. As another example, the preset reduction range may be 5 kilowatt-hours. When the predicted per capita living electricity consumption of the target area in the future time period is 300 kilowatt-hours, the preset maximum per capita living electricity consumption may be 300 kilowatt-hours, 295 kilowatt-hours, 290 kilowatt-hours, 285 kilowatt-hours, 280 kilowatt-hours, 275 kilowatt-hours, 270 kilowatt-hours, and 265 kilowatt-hours.

In some embodiments, the government power supply regulation and management platform 230 may adjust the preset reduction range based on a confidence level of the electricity consumption prediction model. The lower the confidence level of the electricity consumption prediction model is, the larger the preset reduction range may be. A minimum value of the preset maximum per capita living electricity consumption may be appropriately reduced. For example, the electricity consumption prediction model may predict that the per capita living electricity consumption of the target area in the future time period is 300 kilowatt-hours, but the confidence level is low (for example, 60%), which may mean that when the power supply strategy is not implemented, the per capita electricity consumption in the next month may be likely to have a large deviation from 300 kilowatt-hours. Therefore, when generating a candidate power supply strategy, the preset reduction range may be increased, and the minimum value of the preset maximum per capita living electricity consumption may be appropriately reduced (for example, when the predicted per capita living electricity consumption of the target area in the future time period is 300 kilowatt-hours, the preset reduction range may be 20 kilowatt-hours, and the preset minimum value of the maximum per capita living electricity consumption may be set to 240 kilowatt-hours).

In some embodiments, assuming that the electricity consumption prediction model is just trained, the accuracy of the electricity consumption prediction model on the training set may be used as the confidence level of the electricity consumption prediction model. In some embodiments, assuming that the electricity consumption prediction model is not just trained, the average value of the prediction deviations of the previous several time periods may be used as the confidence level of the electricity consumption prediction model. The prediction deviation of a certain time period may be a ratio of the difference between the predicted per capita living electricity consumption in a time period and the actual per capita living electricity consumption in the time period to the predicted per capita living electricity consumption in the time period. For example, the electricity consumption prediction model may predict that the per capita living electricity consumption in a certain time period is 300 kilowatt-hours, and the actual per capita living electricity consumption in the time period is 270 kilowatt-hours, so the prediction deviation may be (300-270)/300=10%.

In some embodiments, the government power supply regulation and management platform 230 may determine the subsidy amount for saving a unit of electricity based on whether the economy of the target area is developed, the electricity price of the target area, and the preset maximum per capita living electricity consumption. For example, the more developed the economy of the target area (that is, the less emphasis on the subsidy amount), the lower the electricity price (that is, the lower the awareness of saving electricity), and the higher the subsidy amount for saving a unit of electricity. As another example, the lower the preset maximum per capita electricity consumption power (that is, the more difficult to reach the per capita living electricity consumption below the preset maximum per capita living electricity consumption), the higher the subsidy amount for saving a unit of electricity.

In 420, a reduction rate corresponding to the each group of the candidate power supply strategies by using an effect prediction model may be predicted based on each group of the candidate power supply strategies and the per capita living electricity consumption of the target area in the future time period.

The reduction rate may refer to a rate at which the per capita living electricity consumption of the target area in the future time period is reduced by implementing a candidate power supply strategy. For example, the per capita living electricity consumption of the target area in the future time period predicted by the electricity consumption prediction model may be 300 kilowatt-hours. The candidate power supply strategy to be implemented may be that the preset maximum per capita living electricity consumption is 300 kilowatt-hours, and 2 cents is subsidized per kilowatt-hour of electricity saved when the actual per capita living electricity consumption is compared with the preset maximum per capita living electricity consumption. After the candidate power supply strategy is implemented, the actual per capita living electricity consumption in the time period is 270 kilowatt-hours, and the reduction rate is: (300-270)/300=10%.

In some embodiments, a reduction rate corresponding to the each group of the candidate power supply strategies by using an effect prediction model may be predicted based on each group of the candidate power supply strategies and the per capita living electricity consumption of the target area in the future time period.

In some embodiments, when each group of candidate power supply strategies and the per capita living electricity consumption of the target area in the future time period are input into the effect prediction model, the reduction rate corresponding to each group of candidate power supply strategies may be predicted by the effect prediction model. In some embodiments, the input of the effect prediction model further may include economic development features of the target area in a current time period.

The effect prediction model may include a neural network model such as a CNN, a RNN, a DNN, or the like. Detailed descriptions regarding electricity consumption prediction model may be found elsewhere in the present disclosure (e.g., FIG. 7 and relevant descriptions), which will not be repeated herein.

In 430, the target power supply strategy of the target area in the future time period may be determined based on the reduction rate corresponding to the each group of the candidate power supply strategies.

In some embodiments, the government power supply regulation and management platform 230 may determine the total amount of subsidy (or referred to as subsidy amount) corresponding to each group of candidate power supply strategies based on each group of candidate power supply strategies. Then, the scheme that the total amount of subsidy does not exceed a threshold of the total amount of subsidy and the reduction rate is largest as the target power supply strategy in the future time period of the target area. The threshold of the total amount of subsidy may be a threshold determined based on the financial situation of the area.

The total amount of subsidy may refer to a total amount of subsidy after a power supply strategy is implemented in the target area in the future time period. In some embodiments, the total amount of subsidy corresponding to the candidate power supply strategy (or the group of the candidate power supply strategies) may be determined based on the total subsidized electricity consumption corresponding to the candidate power supply strategy. For example, assuming that the total subsidized electricity after a group of candidate power supply strategies is implemented in a certain city is 10,000 kilowatt-hours, and per kilowatt-hour of electricity is subsidized by 1 Yuan, the total amount of subsidy after the group of candidate power supply strategies is implemented in the city is 10,000 Yuan.

In some embodiments, the government power supply regulation and management platform 230 may determine the total subsidized electricity consumption corresponding to the candidate power supply strategy based on equation: $Q=(x-y)\times n+Q_1$.

Q denotes a total subsidized electricity consumption corresponding to the candidate power supply strategy; x denotes a preset maximum per capita living electricity consumption corresponding to the candidate power supply strategy; y denotes a per capita living electricity consumption of the target area in the future time period; n denotes a count of persons in the target area; $Q_1$ denotes a total subsidized electricity consumption that exceeds the preset maximum per capita living electricity consumption corresponding to the candidate power supply strategy.

y may be obtained based on a reduction rate. For example, if the per capita living electricity consumption of the target area in the future time period predicted by the electricity consumption prediction model is 300 kilowatt-hours, and the reduction rate predicted by the effect prediction model is 10%, then Y=300*(1−10%)=270. Q1 may be obtained based on historical data. For example, because people whose per capita living electricity consumption exceed the preset maximum per capita living electricity consumption place a relatively low value on the subsidy, the average value of the total electricity consumption that exceeds the preset maximum per capita living electricity consumption corresponding to the candidate power supply strategy in the same month in the past three years may be used as Q1.

Since the per capita living electricity consumption should be reduced after the candidate power supply strategy is implemented, in theory, x may be greater than y. In some embodiments, when the total electricity consumption Q1 exceeding the preset maximum per capita living electricity consumption corresponding to the candidate power supply strategy is 0, due to Q1=0, the equation for the total subsidized electricity consumption corresponding to the candidate power supply strategy may be Q=(x−y)×n. For example, assuming n=3, x=280, y=270 (A first person's living electricity consumption in the future time period is 280 kilowatt-hours; a second person's living electricity consumption in the future time period is 260 kilowatt-hours; a third person's living electricity consumption in the future time period is 270 kilowatt-hours), then Q1=0, Q=(280−270)×3+0=30 kilowatt-hours.

In some embodiments, when the total electricity consumption Q1 exceeding the preset maximum per capita living electricity consumption corresponding to the candidate power supply strategy is greater than 0, and since the total electricity consumption Q1 exceeding the preset maximum per capita living electricity consumption corresponding to the candidate power supply strategy offsets part of the electricity consumption that needs to be subsidized, the total subsidized electricity consumption corresponding to the candidate power supply strategy calculated by the equation of Q=(x−y)×n may be small. The total subsidized electricity consumption corresponding to the candidate power supply strategy should also be added the total electricity consumption Q1 that exceeds the preset maximum per capita living electricity consumption corresponding to the candidate power supply strategy, that is, the equation for determining the total subsidized electricity consumption corresponding to the candidate power supply strategy should be: Q=(x−y)×n+Q1. For example, assuming n=3, x=280, y=270 (A first person's living electricity consumption in the future time period is 300 kilowatt-hours; a second person's living electricity consumption in the future time period is 310 kilowatt-hours; a third person's living electricity consumption in the future time period is 200 kilowatt-hours), Q1= (300−280)+(310−280)=50 kilowatt-hours, Q=(280−270)× 3+50=80 kilowatt-hours.

The reduction rate corresponding to each group of candidate power supply strategies may be predicted by the effect prediction model, and then the target power supply strategy with the highest reduction rate can be determined within the range of the threshold of the total amount of subsidy, which can economically and efficiently reduce the pressure on power supply.

Figure 5:
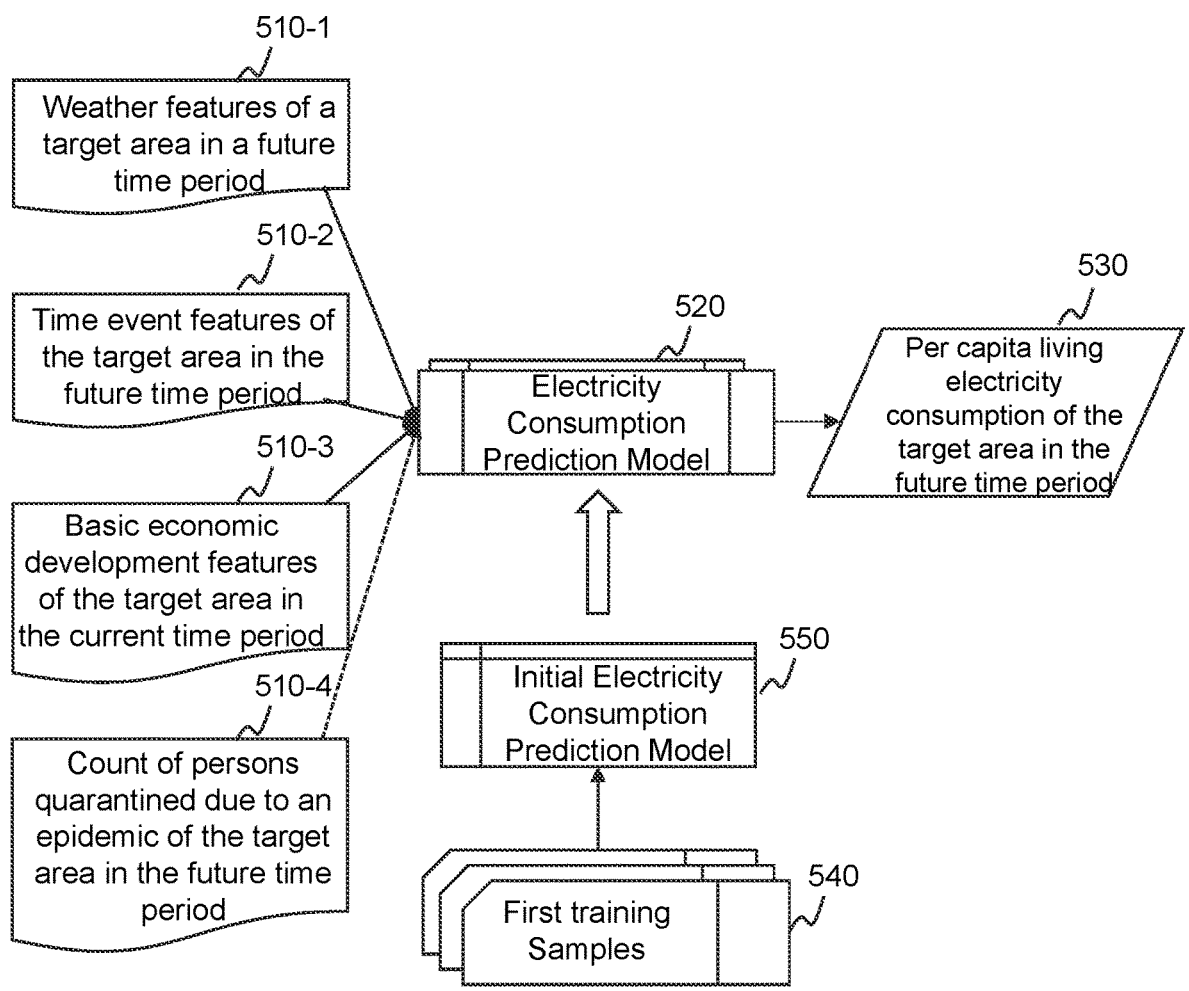
FIG. 5 is a schematic diagram illustrating an exemplary electricity consumption prediction model according to some embodiments of the present disclosure.

FIG. 5 is a schematic diagram illustrating an exemplary electricity consumption prediction model 500 according to some embodiments of the present disclosure.

In some embodiments, as shown in FIG. 5, input of the electricity consumption prediction model 520 may include weather features of a target area in a future time period 510-1, time event features of the target area in the future time period 520-2, and economic development features of the target area in a current time period 530-3, and output may be per capita living electricity consumption of the target area in the future time period 530.

In some embodiments, as shown in FIG. 5, the input of the electricity consumption prediction model 520 may also include a count of persons quarantined due to an epidemic of the target area in the future time period 510-4. People who are quarantined due to the epidemic stay at home for a long time, which may lead to an increase in electricity consumption. Therefore, the input of the electricity consumption prediction model should also consider a count of persons quarantined due to an epidemic of the target area in the future time period.

In some embodiments, the power supply control and management platform may determine, based on a count of persons testing positive for COVID-19 etiological tests, a count of asymptomatic infections, a count of symptomatic infections, a count of medium-risk and high-risk areas, and epidemic prevention and control measures of the target area in the current time period, a count of persons quarantined due to the epidemic of the target area in the future time period through an epidemic prediction model. Detailed descriptions regarding the epidemic prediction model may be found elsewhere in the present disclosure (e.g., FIG. 6 and relevant descriptions), which will not be repeated herein.

In some embodiments, as shown in FIG. 5, parameters of the electricity consumption prediction model 520 may be obtained by training a plurality of groups of labeled first training samples 540. In some embodiments, a plurality of groups of first training samples 540 may be obtained. Each group of first training samples 540 may include a plurality training data and labels corresponding to the training data. The training data may include weather features of the target area in a second historical time period, time event features of the target area in the second historical time period, and economic development features of the target area in a first historical time period. The labels of the training data may include an actual per capita living electricity consumption in the second historical time period, wherein the second historical time period is later than the first historical time period. The parameters of an initial electricity consumption prediction model 550 may be updated through a plurality of groups of first training samples 540 to obtain a trained electricity consumption prediction model 520.

In some embodiments, the parameters of the initial electricity consumption prediction model 550 may be iteratively updated based on the plurality of first training samples 540, so that a loss function of the model may meet a preset condition. For example, the loss function may converge, or the loss function value may be smaller than a preset value. When the loss function meets the preset condition, the model training may be completed, and the trained initial electricity consumption prediction model 550 may be obtained. The electricity consumption prediction model 520 and the trained initial electricity consumption prediction model 550 may have a same model structure.

In some embodiments, when the input of the electricity consumption prediction model 520 also includes a count of persons quarantined due to an epidemic of the target area in the future time period 510-4, accordingly, the first training sample 540 may also include the count of persons quarantined due to an epidemic of the target area in the second historical time period 510-4.

By predicting the per capita living electricity consumption prediction in the future time period by the electricity consumption prediction model, the weather features of a target area in a future time period, the time event features of the target area in the future time period, and the economic development features of the target area in a current time period may be used as the input of the electricity consumption prediction model. Combined with the interrelated prediction results of a count of persons quarantined due to an epidemic of the target area in the future time period, so that the electricity consumption prediction model can predict the per capita living electricity consumption in the future time period more accurate.

Figure 6:
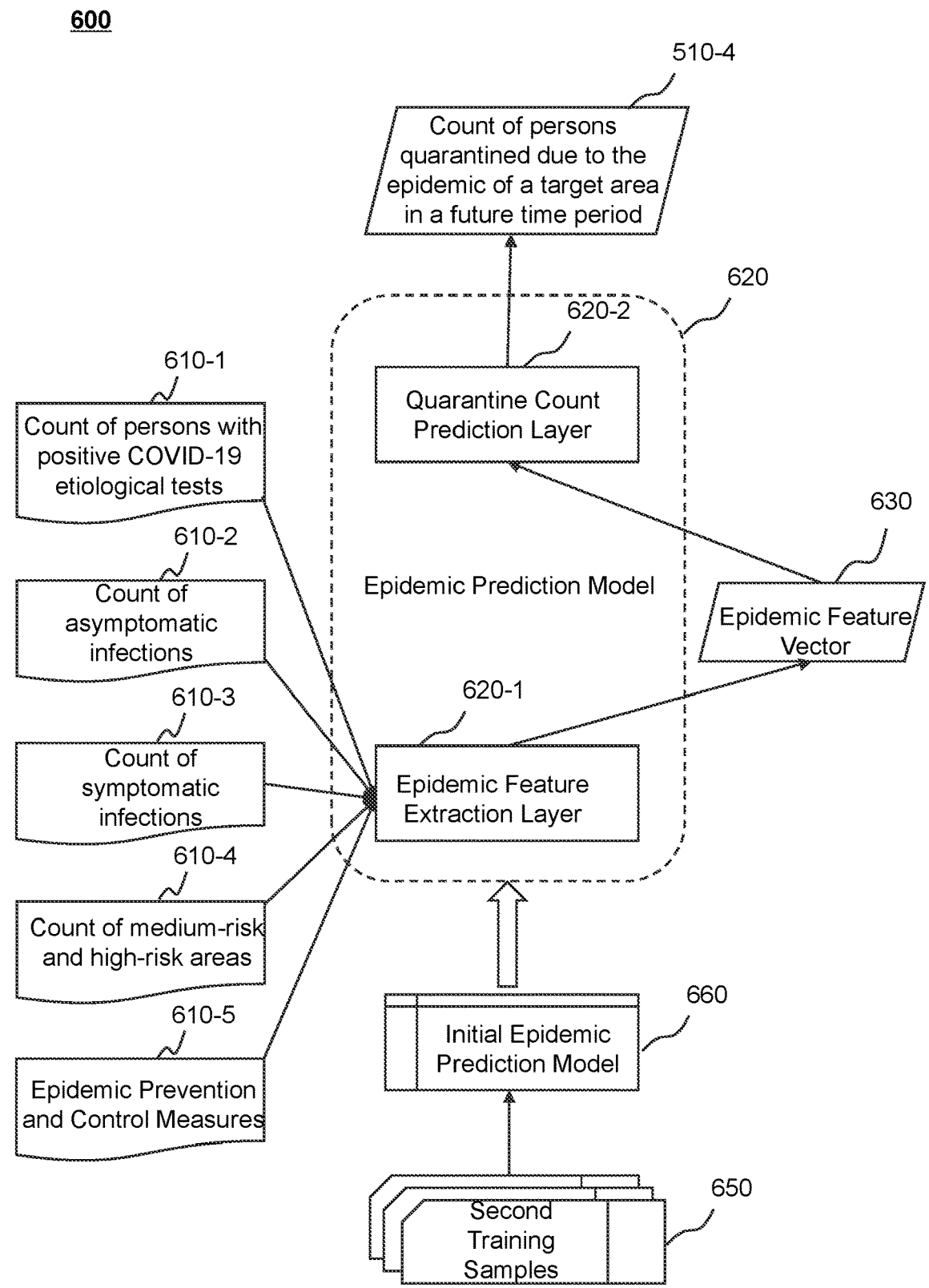
FIG. 6 is a schematic diagram illustrating an exemplary epidemic prediction model according to some embodiments of the present disclosure.

FIG. 6 is a schematic diagram illustrating an exemplary epidemic prediction model 600 according to some embodiments of the present disclosure.

In some embodiments, the epidemic prediction model may include a neural network model such as a CNN, a RNN, a DNN, or the like.

In some embodiments, as shown in FIG. 6, input of the epidemic prediction model 620 may include a count of persons testing positive for COVID-19 etiological tests 610-1, a count of asymptomatic infections 610-2, a count of symptomatic infections 610-3, a count of medium-risk and high-risk areas 610-4, and epidemic prevention and control measures 610-5 of the target area in the current time period. Output may be a count of persons quarantined due to the epidemic 510-4 of the target area in the future time.

In some embodiments, the epidemic prediction model 620 may include an epidemic feature extraction layer 620-1 and a quarantine count prediction layer 620-2.

In some embodiments, the epidemic feature extraction layer 620-1 may determine epidemic feature vectors 630 based on a count of persons testing positive for COVID-19 etiological tests 610-1, a count of asymptomatic infections 610-2, a count of symptomatic infections 610-3, a count of medium-risk and high-risk areas 610-4, and epidemic prevention and control measures 610-5 of the target area in the current time period. The epidemic feature vectors 630 may be feature vectors that characterize epidemic features. In some embodiments, the epidemic feature extraction layer 620-1 may be a CNN.

In some embodiments, the quarantine count prediction layer 620-2 may predict a count of persons quarantined due to the epidemic 510-4 of the target area in the future time be based on the epidemic feature vectors 630. In some embodiments, the quarantine count prediction layer 620-2 may be a DNN.

In some embodiments, the epidemic feature extraction layer 620-1 and the quarantine count prediction layer 620-2 may be joint trained based on the training samples to update parameters.

In some embodiments, the epidemic prediction model 620 may be obtained by training based on historical epidemic data. The historical epidemic data may include a count of persons testing positive for COVID-19 etiological tests, a count of asymptomatic infections, a count of symptomatic infections, a count of medium-risk and high-risk areas, and epidemic prevention and control measures in a historical current period. A count of persons testing positive for COVID-19 etiological tests, a count of asymptomatic infections, a count of symptomatic infections, a count of medium-risk and high-risk areas, and epidemic prevention and control measures in a historical current period may be used as training samples. Labels of the training samples may include an actual count of persons quarantined due to an epidemic of the target area in the second historical time period. Specifically, second training samples 650 with the labels may be input into an initial epidemic prediction model 660, and parameters of the initial epidemic prediction model 660 may be updated through training. When a trained model meets the preset conditions, the training may end, and the trained epidemic prediction model 620 may be obtained.

A count of persons quarantined due to an epidemic of the target area in the second historical time period may be predicted through the epidemic prediction model, and the parameters of the epidemic prediction model may be obtained by combining training, which is conducive to solving the problem of difficult to obtain labels when the epidemic feature extraction layer is trained alone. Secondly, the joint training of the epidemic feature extraction layer and the quarantine count prediction layer can not only reduce a count of samples needed, but also improve the training efficiency.

Figure 7:
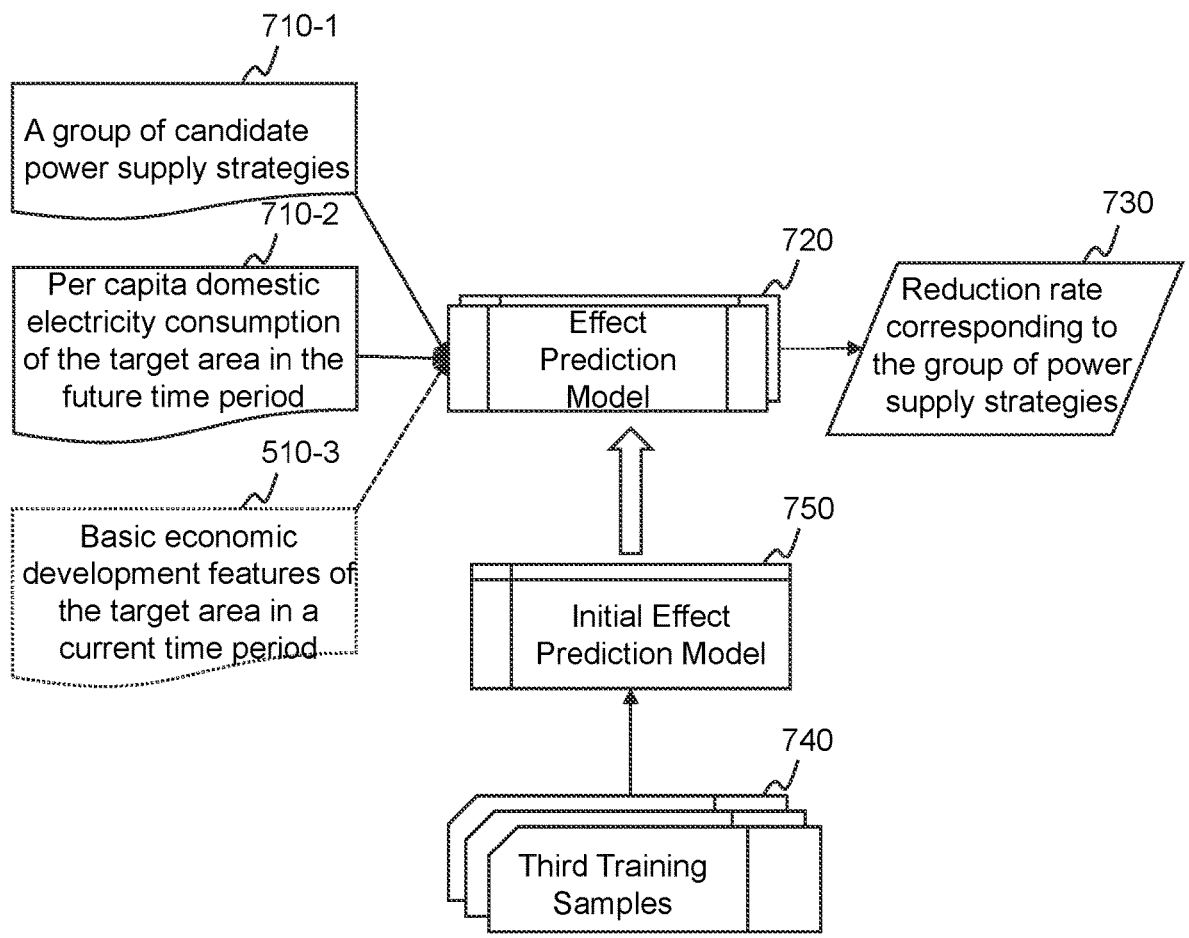
FIG. 7 is a schematic diagram illustrating an exemplary effect prediction model according to some embodiments of the present disclosure.

FIG. 7 is a schematic diagram illustrating an exemplary effect prediction model 700 according to some embodiments of the present disclosure.

In some embodiments, as shown in FIG. 7, input of the effect prediction model 720 may include a group of candidate power supply strategies 710-1, and the per capita living electricity consumption of the target area in the future time period 710-2, and output may be a reduction rate corresponding to the group of power supply strategies 730.

In some embodiments, as shown in FIG. 7, the input of the effect prediction model 720 may also include economic development features of the target area in a current time period 510-3. If the basic economic development of the target area in the current time period is good, and the emphasis on the subsidy amount may be relatively low, which may lead to poor implementation of the power supply policy. Therefore, the input of the effect prediction model may also consider the economic development features of the target area in the current time period.

In some embodiments, as shown in FIG. 7, parameters of the effect prediction model 720 may be obtained by training a plurality of groups of labeled third training samples 740. In some embodiments, a plurality of groups of third training samples 740 may be obtained. Each group of third training samples 740 may include a plurality of training data and labels corresponding to the training data. The training data may include power supply strategies in a second historical time period, and per capita living electricity consumption of the target area in the second historical time period. The labels of the training data may include an actual reduction rate in the second historical time period. The parameters of an initial effect prediction model 750 may be updated through a plurality of groups of third training samples 740 to obtain a trained effect prediction model 720.

In some embodiments, the parameters of the initial effect prediction model 750 may be iteratively updated based on the plurality of third training samples 740, so that a loss function of the model may meet a preset condition. For example, the loss function may converge, or the loss function value may be smaller than a preset value. When the loss function meets the preset condition, the model training may be completed, and the trained initial effect prediction model 750 may be obtained. The effect prediction model 720 and the trained initial effect prediction model 750 may have a same model structure.

In some embodiments, when the input of the effect prediction model 720 also includes the economic development features of the target area in a current time period 510-3, accordingly, the third training samples 740 may also include the economic development features of the target area in a first historical time period.

By predicting the reduction rate corresponding to each group of the candidate power supply strategies by the effect prediction model, each group of candidate power supply strategies and the per capita living electricity consumption of the target area in the future time period may be used as the input of the effect prediction model. Combine with the interrelated prediction results of the economic development features of the target area in the current period, so that the effect prediction model can predict the reduction rate corresponding to each group of the candidate power supply strategies more accurate.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

We claim:

1. A method for government power supply regulation in a smart city, executed by a government power supply regulation and management platform of a system for government power supply regulation in a smart city, wherein the system further includes a user platform, a government service platform, a government sensor network platform, and an object platform;

the user platform is configured to obtain query instructions from citizens through a terminal device, query a power supply strategy of a target area, and feedback information of an electricity consumption subsidy scheme to the citizens;

the government service platform is configured to obtain the query instructions issued by the citizens through the user platform, query the electricity consumption subsidy scheme, and feedback the electricity consumption subsidy scheme to the citizens;

the government power supply regulation and management platform includes a management information-integrated management platform and a plurality of management sub-platforms, the management information-integrated management platform is configured to perform integrated management on received information, and send the received information to the government service platform according to needs of the citizens;

the government sensor network platform is configured as an Internet of Things gateway, which is configured to establish a channel for uploading perception information of at least one of the terminal device and a smart meter, and issuing control information of the government power supply regulation and management platform;
the object platform is configured as the terminal device and the smart meter, and is configured to upload collected data related to power supply prediction to the government sensor network platform, the government sensor network platform is configured to summarize and process the collected data, and upload processed data to the government power supply regulation and management platform, the government power supply regulation and management platform is configured to make power supply strategies and send the power supply strategies to power supply enterprises for supplying electricity to the citizens; and the method comprises:
obtaining weather features of the target area in a future time period, time event features of the target area in the future time period, and economic development features of the target area in a current time period, the target area including a city and an area;
predicting, based on the weather features of the target area in the future time period, the time event features of the target area in the future time period, the economic development features of the target area in the current time period, and a count of persons quarantined due to an epidemic of the target area in the future time period, per capita living electricity consumption of the target area in the future time period through an electricity consumption prediction model, wherein the count of persons quarantined due to the epidemic of the target area in the future time period is determined based on a count of persons testing positive for COVID-19 etiological tests, a count of asymptomatic infections, a count of symptomatic infections, a count of medium-risk and high-risk areas, and epidemic prevention and control measures of the target area in the current time period through an epidemic prediction model, and the epidemic prediction model includes an epidemic feature extraction layer and a quarantine count prediction layer, and the epidemic prediction model is obtained through a training process including:
    obtaining a plurality of training samples and labels thereof, wherein the plurality of training samples include historical data of the count of persons testing positive for COVID-19 etiological tests, the count of asymptomatic infections, the count of symptomatic infections, the count of medium-risk and high-risk areas, and the epidemic prevention and control measures in a first historical time period, and the labels include a count of persons quarantined due to the epidemic of the target area in a second historical time period;
    inputting the training samples with the labels into an initial epidemic prediction model, and updating parameters of the initial epidemic prediction model through training;
    when a trained model meets preset conditions, stopping the training process, and obtaining the epidemic prediction model;
determining, based on the per capita living electricity consumption of the target area in the future time period, the power supply strategy of the target area in the future time period, and distributing electricity subsidies to the citizens;
determining, based on the power supply strategy, a total subsidy amount corresponding to the power supply strategy through the government power supply regulation and management platform, and
sending the total subsidy amount to a financial management sub-platform of the government power supply regulation and management platform, to distribute the electricity subsidies to the citizens.

2. The method of claim 1, wherein the electricity consumption prediction model is obtained through a training process including:
    obtaining a plurality of training samples and labels thereof, wherein the plurality of training samples include weather features of the target area in the second historical-time period, time event features of the target area in the second historical time period, and economic development features of the target area in the first historical time period, and the labels include an actual per capita living electricity consumption in the second historical time period, wherein the second historical time period is later than the first historical time period; and
    training, based on the plurality of training samples, an initial electricity consumption prediction model to obtain the electricity consumption prediction model.

3. The method of claim 1, wherein an input of the epidemic feature extraction layer includes the count of persons testing positive for COVID-19 etiological tests, the count of asymptomatic infections, the count of symptomatic infections, the count of medium-risk and high-risk areas, and the epidemic prevention and control measures of the target area in the current time period, an output of the epidemic feature extraction layer includes epidemic feature vectors, an input of the quarantine count prediction layer includes the epidemic feature vectors, and an output of the quarantine count prediction layer includes the count of persons quarantined due to the epidemic of the target area in the future time period.

4. The method of claim 1, further comprising determining, based on the per capita living electricity consumption of the target area in the future time period, a target power supply strategy of the target area in the future time period, wherein the determining, based on the per capita living electricity consumption of the target area in the future time period, a target power supply strategy of the target area in the future time period includes:
    obtaining a plurality of groups of power supply strategies of the target area in the future time period as candidate power supply strategies;
    predicting, based on each group of the candidate power supply strategies and the per capita living electricity consumption of the target area in the future time period, a reduction rate corresponding to the each group of the candidate power supply strategies by using an effect prediction model; and
    determining, based on the reduction rate corresponding to the each group of the candidate power supply strategies, the target power supply strategy of the target area in the future time period.

5. The method of claim 4, wherein the effect prediction model is obtained through a training process including:
    obtaining a plurality of training samples and labels thereof, wherein the plurality of training samples include power supply strategies in the second historical time period, per capita living electricity consumption of the target area in the second historical time period, and the labels include an actual reduction rate in the second historical time period; and training, based on the plurality of training samples, an initial effect prediction model to obtain the effect prediction model.

6. The method of claim 4, wherein an input of the effect prediction model further includes the economic development features of the target area in the current time period.

7. The method of claim 1, wherein the obtaining weather features of a target area in a future time period, time event features of the target area in the future time period, and economic development features of the target area in a current time period includes:
based on the object platform, obtaining the weather features of the target area in the future time period by the terminal device, the time event features of the target area in the future time period, and the economic development features of the target area in the current time period through the government sensor network platform, the weather features of the target area in the future time period referring to predicted average values of temperature and rainfall of the target area in the future time period, the time event features of the target area in the future time period being a total count of holidays in the future time period.

8. The method of claim 1, wherein the method further comprises:
determining subsidy amount for saving a unit of electricity based on whether the economy of the target area is developed, an electricity price of the target area, and a preset maximum per capita living electricity consumption.

9. The method of claim 1, wherein the government sensor network platform includes a plurality of sensor network sub-platforms, the sensor network sub-platforms correspond to different object platforms and each of the sensor network sub-platforms includes a terminal device sub-platform and a smart meter sub-platform; the sensor network sub-platform is configured to process data uploaded by the terminal device and the smart meter and store the data to a sensor network platform database, the data being distributed to different sensor network platform sub-databases for processing and storage; the processed data is summarized and stored by the sensor network platform database, transmitted to a sensor information integrated management platform, uniformly transmitted to the government power supply regulation and management platform by the sensor information integrated management platform, and stored by a management platform database.

10. An Internet of Things system for government power supply regulation in a smart city, comprising a user platform, a government service platform, a government power supply regulation and management platform, a government sensor network platform, and an object platform that interact in sequence; wherein the user platform is configured to obtain query instructions from citizens through a terminal device, query a power supply strategy of a target area, and feedback information of a electricity consumption subsidy scheme to the citizens;
the government service platform is configured to obtain the query instructions issued by the citizens through the user platform, query the electricity consumption subsidy scheme, and feedback the electricity consumption subsidy scheme to the citizens;
the government power supply regulation and management platform includes a management information-integrated management platform and a plurality of management sub-platforms, the management information-integrated management platform is configured to perform integrated management on received information, and send the received information to the government service platform according to needs of the citizens;
the government sensor network platform is configured as an Internet of Things gateway, which is configured to establish a channel for uploading perception information of at least one of the terminal device and a smart meter, and issuing control information of the government power supply regulation and management platform;
the object platform is configured as the terminal device and the smart meter, and is configured to upload collected data related to power supply prediction to the government sensor network platform, the government sensor network platform is configured to summarize and process the collected data, and upload processed data to the government power supply regulation and management platform, the government power supply regulation and management platform is configured to make power supply strategies and send the power supply strategies to power supply enterprises for supplying electricity to the citizens; wherein the government power supply regulation and management platform is configured to perform operations including:
obtaining weather features of the target area in a future time period, time event features of the target area in the future time period, and economic development features of the target area in a current time period, the target area including a city and an area;
predicting, based on the weather features of the target area in the future time period, the time event features of the target area in the future time period, the economic development features of the target area in the current time period, and a count of persons quarantined due to an epidemic of the target area in the future time period, per capita living electricity consumption of the target area in the future time period through an electricity consumption prediction model, wherein the count of persons quarantined due to the epidemic of the target area in the future time period is determined based on a count of persons testing positive for COVID-19 etiological tests, a count of asymptomatic infections, a count of symptomatic infections, a count of medium-risk and high-risk areas, and epidemic prevention and control measures of the target area in the current time period through an epidemic prediction model, and the epidemic prediction model includes an epidemic feature extraction layer and a quarantine count prediction layer, and the epidemic prediction model is obtained through a training process including:
obtaining a plurality of training samples and labels thereof, wherein the plurality of training samples include historical data of the count of persons testing positive for COVID-19 etiological tests, the count of asymptomatic infections, the count of symptomatic infections, the count of medium-risk and high-risk areas, and the epidemic prevention and control measures in a first historical time period, and the labels include a count of persons quarantined due to the epidemic of the target area in a second historical time period;
inputting the training samples with the labels into an initial epidemic prediction model, and updating parameters of the initial epidemic prediction model through training;

when a trained model meets preset conditions, stopping the training process, and obtaining the epidemic prediction model; and determining, based on the per capita living electricity consumption of the target area in the future time period, the power supply strategy of the target area in the future time period, and distributing electricity subsidies to the citizens;

determining, based on the power supply strategy, a total subsidy amount corresponding to the power supply strategy through the government power supply regulation and management platform, and sending the total subsidy amount to a financial management sub-platform of the government power supply regulation and management platform, to distribute the electricity subsidies to the citizens.

11. The system of claim 10, wherein the electricity consumption prediction model is obtained through a training process including:

obtaining a plurality of training samples and labels thereof, wherein the plurality of training samples include weather features of the target area in the second historical-time period, time event features of the target area in the second historical time period, and economic development features of the target area in the first historical time period, and the labels include an actual per capita living electricity consumption in the second historical time period, wherein the second historical time period is later than the first historical time period; and training, based on the plurality of training samples, an initial electricity consumption prediction model to obtain the electricity consumption prediction model.

12. The system of claim 10, wherein an input of the epidemic feature extraction layer includes the count of persons testing positive for COVID-19 etiological tests, the count of asymptomatic infections, the count of symptomatic infections, the count of medium-risk and high-risk areas, and the epidemic prevention and control measures of the target area in the current time period, an output of the epidemic feature extraction layer includes epidemic feature vectors, an input of the quarantine count prediction layer includes the epidemic feature vectors, and an output of the epidemic feature extraction layer includes the count of persons quarantined due to the epidemic of the target area in the future time period.

13. The system of the claim 10, wherein the government power supply regulation and management platform is further configured to perform operations including determining, based on the per capita living electricity consumption of the target area in the future time period, a target power supply strategy of the target area in the future time period, wherein to determine, based on the per capita living electricity consumption of the target area in the future time period, a target power supply strategy of the target area in the future time period, the government power supply regulation and management platform is further configured to perform operations including:

obtaining a plurality of groups of power supply strategies of the target area in the future time period as candidate power supply strategies;

predicting, based on each group of the candidate power supply strategies and the per capita living electricity consumption of the target area in the future time period, a reduction rate corresponding to the each group of the candidate power supply strategies by using an effect prediction model; and determining, based on the reduction rate corresponding to the each group of the candidate power supply strategies, the target power supply strategy of the target area in the future time period.

14. The system of claim 13, wherein the effect prediction model is obtained through a training process including:

obtaining a plurality of training samples and labels thereof, wherein the plurality of training samples include power supply strategies in the second historical time period, per capita living electricity consumption of the target area in the second historical time period, and the labels include an actual reduction rate in the second historical time period; and training, based on the plurality of training samples, an initial effect prediction model to obtain the effect prediction model.

15. The system of claim 13, wherein an input of the effect prediction model further includes the economic development features of the target area in the current time period.

* * * * *